United States Patent
Fasching et al.

(10) Patent No.: US 9,112,212 B1
(45) Date of Patent: Aug. 18, 2015

(54) FORMING MULTILAYERED SOLID ELECTROLYTE INTERPHASE STRUCTURES ON HIGH CAPACITY ELECTRODES

(75) Inventors: Rainer J Fasching, Mill Valley, CA (US); Gregory Alan Roberts, Oakland, CA (US); Yi Cui, Stanford, CA (US); Song Han, Foster City, CA (US)

(73) Assignee: Amprius, Inc., Sunnyvale, CA (US)

( * ) Notice: Subject to any disclaimer, the term of this patent is extended or adjusted under 35 U.S.C. 154(b) by 477 days.

(21) Appl. No.: 13/281,252

(22) Filed: Oct. 25, 2011

Related U.S. Application Data (60) Provisional application No. 61/406,785, filed on Oct. 26, 2010.

(51) Int. Cl.
*H01M 4/134* (2010.01)
*H01M 4/02* (2006.01)

(52) U.S. Cl.
CPC ............... *H01M 4/134* (2013.01); *H01M 4/02* (2013.01)

(58) Field of Classification Search
None
See application file for complete search history.

(56) References Cited

U.S. PATENT DOCUMENTS

| | | | |
|---|---|---|---|
| 7,816,031 B2 | 10/2010 | Cui et al. | |
| 2003/0068562 A1* | 4/2003 | Kim et al. | 429/326 |
| 2007/0190418 A1 | 8/2007 | Chiang et al. | |
| 2009/0011333 A1* | 1/2009 | Wakita et al. | 429/220 |
| 2009/0169996 A1 | 7/2009 | Zhamu et al. | |
| 2010/0047695 A1* | 2/2010 | Smart et al. | 429/307 |

FOREIGN PATENT DOCUMENTS

WO 2010/014387 2/2010

OTHER PUBLICATIONS

U.S. Appl. No. 12/944,572, "Conducting Formation Cycles," Cui et al., filed Nov. 11, 2010.
U.S. Appl. No. 12/437,529, "Electrode including Nanostructures for Rechargeable Cells," Cui et al., filed May 7, 2009.
Kasavajjula et al., "Nano- and bulk-silicon-based insertion anodes for lithium-ion secondary cells," J. Power Sources 163, 1003-1039 (2007).

(Continued)

*Primary Examiner* — Miriam Stagg
*Assistant Examiner* — Carmen Lyles-Irving
(74) *Attorney, Agent, or Firm* — Weaver Austin Villeneuve & Sampson LLP (57) ABSTRACT

Provided are novel methods of fabricating electrochemical cells containing high capacity active materials that form multilayered solid electrolyte interphase (SEI) structures on the active material surface during cell fabrication. Combining multiple different SEI layers on one surface can substantially improve cell performance by providing each layer with different properties. For example, an outer layer having a high electronic resistance may be combined with an inner layer having a high ionic permeability. To form such multilayered SEI structures, formation may involve changing electrolyte composition, functionalizing surfaces, and/or varying formation conditions. For example, formation may start with a boron containing electrolyte. This initial electrolyte is then replaced with an electrolyte that does not contain boron and instead may contain fluorine additives. In certain embodiments, cell's temperature is changed during formation to initiate different chemical reactions during SEI formation. Variations in multilayered SEI structures may be also achieved by varying current rates.

13 Claims, 7 Drawing Sheets

(56) References Cited

OTHER PUBLICATIONS

Choi et al., "Surface layer formed on silicon thin-film electrode in lithium bix(oxalato) borate-based electrolyte," Journal of Power Sources 172 (2007) 404-409, Apr. 30, 2007.

Xu, Kang, "Nonaqueous liquid electrolytes for lithium-based rechargeable batteries," Chem. Rev. 2004, 104, 4303-4417, Nov. 3, 2003.

Xu et al., "Composite silicon nanowire anodes for secondary lithium-ion cells," Journal of the Electrochemical Society, 157, (1) A41-A45 (2010), Nov. 10, 2009.

Xu et al., "LiBOB: is it an alternative salt for lithium ion chemistry?," Journal of Power Sources 146 (2005) 79-85, May 31, 2005.

U.S. Appl. No. 12/944,572, Office Action mailed Sep. 12, 2013.

U.S. Appl. No. 12/944,572, Notice of Allowance mailed Mar. 27, 2014.

Chan, et al., "Surface chemistry and morphology of the solid electrolyte interphase on silicon nanowire lithium ion battery anodes," Journal of Power Sources, vol. 189, 2009, pp. 1132-1140.

\* cited by examiner

FORMING MULTILAYERED SOLID ELECTROLYTE INTERPHASE STRUCTURES ON HIGH CAPACITY ELECTRODES

CROSS-REFERENCE TO RELATED APPLICATIONS

This application claims the benefit under 35 U.S.C. §119 (e) of U.S. Provisional Patent Application No. 61/406,785, entitled "FORMING SOLID ELECTROLYTE INTERPHASE LAYERS ON HIGH CAPACITY ELECTRODES" filed on Oct. 26, 2010, which is incorporated herein by reference in its entirety.

STATEMENT OF GOVERNMENT SUPPORT

The invention described and claimed herein was made with United States Government support under NIST ATP Award No. 70NANB10H006, awarded by the National Institute of Standards and Technology. The United States Government has certain rights in this invention.

BACKGROUND

The demand for high capacity rechargeable electrochemical cells is strong. Many areas of application, such as aerospace, medical devices, portable electronics, and automotive, require high gravimetric and/or volumetric capacity cells. Lithium ion technology represents a significant improvement in this regard. However, to date, application of this technology has been primarily limited to graphite negative electrodes, and graphite has a theoretical capacity of only 372 mAh/g during lithiation.

Silicon, germanium, tin, and many other materials are desirable negative active electrode materials because of their high electrochemical capacities. For example, the theoretical capacity of silicon during lithiation is estimated to be about 4,200 mAh/g. However, many of these materials have not been widely adopted because of their poor cycle life performance. One reason for this poor performance is substantial volumetric change during cycling. Silicon, for example, swells by as much as 400% when it is lithiated to its maximum capacity. Volume changes of such magnitude can cause considerable stress in high capacity active material structures and their solid electrolyte interphase (SEI) layers. This stress, in turn, results in fractures and pulverization and significant capacity fading. It is believed that SEI layer formation is accompanied by considerable loss of lithium ions. Further, it is believed that an SEI layer formed on high capacity active material structures continues to break and reform after initial formation, as the structures are repeatedly lithiated and delithiated. This continuous SEI layer formation also continues to consume lithium ions and other electrolyte components. Furthermore, portions of the SEI layer may become unusually thick as newly-formed SEI materials move around in this dynamic SEI layer. These phenomena are believed to cause at least some capacity fading. Overall, capacity fading is generally much higher for cells built with high capacity materials than cells built with conventional graphite, which is attributable, at least in part, to unstable SEI layers formed over high capacity active material structures.

SUMMARY

Provided are novel methods of fabricating electrochemical cells containing high capacity active materials that form multilayered solid electrolyte interphase (SEI) structures on the active material surface during cell fabrication. Combining multiple different SEI layers on one surface can substantially improve cell performance by providing each layer with different properties. For example, an outer layer having a high electronic resistance may be combined with an inner layer having a high ionic permeability. To form such multilayered SEI structures, formation may involve changing electrolyte composition, functionalizing surfaces, and/or varying formation conditions. For example, formation may start with a boron containing electrolyte. This initial electrolyte is then replaced with an electrolyte that does not contain boron and instead may contain fluorine additives. In certain embodiments, cell's temperature is changed during formation to initiate different chemical reactions during SEI formation. Variations in multilayered SEI structures may be also achieved by varying current rates.

In certain embodiments, a method of fabricating a rechargeable electrochemical cell involves assembling a cell including a negative electrode, a second electrode including lithium, and an electrolyte that provides ionic communication between the negative electrode and the second electrode. The negative electrode includes a high capacity active material having an exposed surface. The method may proceed with conducting a first phase of formation using a first set of process parameters to form a first portion of a multilayered solid electrolyte interphase (SEI) structure on the exposed surface of the high capacity active material. The method then proceeds with conducting a second phase of formation using a second set of process parameters to form a second portion of the multilayered SEI structure on the exposed surface of the high capacity active material. One or more parameters in the first set of process parameters differ from the corresponding parameters in the second set of process parameters. Only one or multiple parameters may vary. Examples of process parameters include cell temperature, charge rate, discharge rate, and electrolyte composition.

In certain embodiments, the first electrolyte composition is different from the second electrolyte composition. For example, the first electrolyte composition may include one or more boron based additives. The second electrolyte composition may include one or more fluoro-ethylene carbonate (FEC) additives. In the same or other embodiments, the first temperature is lower than the second temperature. For example, the first temperature may be less than about 30 degrees Centigrade. The second temperature may be at least about 40 degrees Centigrade. In certain embodiments, the first temperature is at least about 10 degrees Centigrade than the second temperature. The first charge rate may be higher than the second charge rate. For example, the first charge rate may be at least twice greater than the second charge rate.

In certain embodiments, the first electrolyte composition includes one or more of the following materials: a sulfone, a nitrile, a dinitrile, a carboxylate, and an ether. At least one of these materials may be not present in the second electrolyte composition. The second electrode may be replaced with a third electrode after conducting the first phase of formation and prior to conducting the second phase of formation. In certain embodiments, the exposed surface of the high capacity active material is functionalized prior to conducting the first phase of formation. The functionalized surface may include one or more of the following materials: a catalyst, a partially formed SEI layer, and a carbon based material. In the same or other embodiments, the high capacity material has a specific surface area of least about 10 millimeters square per gram. The first portion may have a different composition and/or morphology than the second portion.

Provided also is an electrode of an electrochemical cell. The electrode may include an electrochemically active structure including a high capacity active material and a multilayered SEI structure formed on a surface of the electrochemically active structure. The multilayered SEI structure may include an inner SEI layer over the electrochemically active structure and an outer SEI layer over the inner SEI layer, such that the inner SEI layer has a different composition and/or morphology than the outer SEI layer. In certain embodiments, the inner SEI layer has a higher ionic conductivity than the outer SEI layer. The inner SEI layer may be at least about twice as thick as the outer SEI layer. The inner SEI layer may have has a thickness of between about 5 nanometers and 50 nanometers.

In certain embodiments, the outer SEI layer includes boron. For example, the outer SEI layer may include one or more boron-based salts, such as lithium bis(oxalato)borate (LiBOB). In the same or other embodiments, the outer SEI layer includes one or more ethylene carbonate reduction products. The inner SEI layer may include one or more polyvinylene carbonates. The porosity of the inner SEI layer may be greater than a porosity of the outer SEI layer. For example, the inner SEI layer may have a porosity of between about 30% and 60%. In certain embodiments, the high capacity active material may include one or more of the following materials: silicon, tin, and germanium. The electrochemically active structure may be in the form of a nanostructure.

In certain embodiments, the multilayered SEI structure also includes an intermediate SEI layer positioned in between the inner SEI layer and the outer SEI. The intermediate SEI layer has a different composition or morphology than the outer SEI layer and a different composition or morphology than the inner SEI layer. The intermediate SEI layer may be used to provide adhesion between the inner and outer SEI layer and/or further enhance characteristics of the multilayered SEI structure.

Provided also an electrochemical cell including a negative electrode including an electrochemically active structure including a high capacity active material and a multilayered SEI structure formed on a surface of the electrochemically active structure during formation of the electrochemical cell. The multilayered SEI structure includes an inner SEI layer formed over the electrochemically active structure and an outer SEI layer formed over the inner SEI layer. The inner SEI layer has a different composition and/or morphology than the outer SEI layer.

These and other embodiments are described further below with reference to the figures.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Lithium ion cells are typically assembled in a discharged state, such that most or all lithium available for electrochemical transfer between the electrodes is provided on the positive electrode. The initial charging and, in certain embodiments, initial discharging may cause irreversible transformations within the cell and is, therefore, typically performed in a controlled manner. This initial cycling is referred to herein as "formation" or "formation cycling" and is generally considered a part of the overall cell fabrication. While formation is conventionally performed after a cell is assembled and sealed, various formation techniques described herein may be performed on a partially fabricated cell. For example, an electrolyte may be changed or otherwise modified during formation. Further, while formation is conventionally performed at constant formation conditions, techniques described herein indicate that varying formation conditions may be used to form multilayered SEI structures with desired characteristics that are generally not achievable with conventionally formed SEI layers.

A brief description of formation of SEI layers and corresponding multilayered SEI structures may be useful in understanding the various techniques and structures described in this document. In lithium ion cells, formation involves one or more initial cycles during which some lithium ions are driven from the positive electrode active material and transferred to the negative electrode active material. This process is sometimes referred to as negative electrode lithiation and is driven by a voltage applied to the positive and negative electrodes. The voltage is controlled to achieve a desired lithium ion transfer rate, which is referred to as a rate of charge or discharge and generally expressed as a ratio to the overall operating capacity, e.g., C/10, C/100. For example, C/10 rate would require 10 hours to charge a cell from its fully discharged state to its fully charged state. It should be noted that these fully discharged and charged states generally do not correspond to theoretical capacity limits of the active. Further, formation may involve one or more charge-discharge cycles or a portion of one or more of these cycles. Formation may also be divided into multiple phases. Each phase may include one or more charge-discharge cycles or some portions thereof. For example, a first phase may include a partial charge of the cell. The charge then continues during another phase. Therefore, the end of a phase may fall anywhere within the charging or discharging parts of the charge-discharge cycle. In certain embodiments, the end of a phase corresponds with one of the ends of the charge-discharge cycle. As further described below in this document, different phases of formation may be performed with different process conditions, such as with different electrolyte compositions, different counter electrodes, different temperatures, different charge and/or discharge rates, and various combinations thereof.

This applied voltage causes some potential gradient at the surface of the negative electrode, which in turn results in reduction of the electrolyte at this surface and formation of the SEI layer. In general, formation of the SEI layer is a rather complex phenomenon influenced by electrolyte formulation, potential gradient at the surface, surface properties, and other factors. In conventional graphite-based cells, an SEI layer is believed to be composed of various reduction reaction products, such as $Li_2Co_3$ and LiF. As the electronically insulating SEI layer grows, the reduction of the electrolyte slows and eventually stops. At this point, the SEI layer has grown thick enough to prevent electron transfer or tunneling between the electrode surface and the electrolyte. In other words, the resistive SEI layer provides a sufficient voltage drop and further reduction of electrolyte is prevented.

An SEI layer or a corresponding multilayered SEI structure contributes in important ways to the safety, power capability, morphology of lithium deposits, shelf life, and cycle life of the cell. Good cell performance generally corresponds to a stable SEI layer or structure that resists further electrolyte reduction during operational cycling of the cell, i.e., cycling after formation. When electrolyte reduction continues after formation is completed, a thickening SEI layer and/or changing formulation of the electrolyte may lead to high internal resistance, self-discharge, and low Faradaic efficiency that can all diminish the overall performance of the cell.

In addition to being electronically resistive in order to reduce the potential at its surface and prevent further electrolyte reduction, it is useful if an SEI layer or a corresponding multilayered SEI structure is permeable to ions transferring to the negative electrode during the charge part of a cycle and transferring out of the negative electrode during the discharge part of a cycle. In other words, an SEI layer should have sufficient cation mobility. In certain embodiments, the lithium cation transference number approaches one to eliminate concentration polarization and to facilitate lithium dissolution-deposition processes. SEI components that are resistant to diffusive or migration-based transport of anions, neutral species, non-lithium cations, and solvated lithium cations may be used in the multi-layered structure.

Any single SEI layer will typically have a uniform morphology and chemical composition along its exposed surface, ensuring homogeneous distribution of the electrical current throughout this surface. However, it has been found that varying morphology and chemical composition throughout the thickness of a multilayered SEI structure can provide additional functionality not previously achievable with conventional SEI layers. For example, a multilayered SEI structure may have variable flexibility characteristics across its thickness attributable to different composition and/or morphology. The inner SEI layer interfaces with the high capacity active material that tends to undergo major volume change. This SEI layer may be more flexible to allow even distribution of mechanical stresses (within the electrode structure) that are generated during these volume changes. Such flexible layers may be more ionically conductive and, therefore, may be much thicker than conventional SEI layer while maintaining the same ionic transference characteristics. However, these flexible layers may be permeable to electrolyte solvents and may not provide sufficient protection from these solvents by itself. In the same multilayered SEI structure, the outer layer may be more rigid and more impermeable to the electrolyte solvents. It may provide sufficient protection from the solvents and, therefore, prevents contact of the active material and solvents thereby impeding addition SEI layer formation.

If this outer SEI layer is formed directly on the high capacity active material as may occur in some conventional SEI layers, then stress concentrations caused by volume changes of the active material may damage this hard and inflexible SEI layer. This damage may expose portions of the active material to the electrolyte causing further SEI formation that may occur in less desirable operating conditions as opposed to well controlled formation conditions. As a result, the electrochemical cell may suffer major capacity loss. Likewise, if a flexible inner SEI layer is formed without any additional outer SEI layer protecting it from the electrolyte, then this relatively permeable SEI layer would allow the electrolyte solvents to come in contact with the active material and cause uncontrollable formation of additional SEI layers at this interface. However, forming a multilayered SEI structure having both of these layers in the manner describe above helps to avoid this problem and have a robust SEI layer that can perform with high capacity active materials in effective manner. This example presents only one possible design and corresponding operation characteristics of a multilayered SEI structure. Other examples are further explored below.

An SEI layer or a multilayered SEI structure forms a protective electronically insulating coating over a negative electrode surface and generally needs to be mechanically stable and flexible during cycling. Any damage to the SEI layer or structure generally causes increase in the potential in the damaged area and formation of additional SEI patches on the newly-exposed negative electrode active material. This process will repeat for any new damaged area and continue until the potential drops to the level at which the electrolyte is not reduced anymore. It has been found that high capacity active materials that tend to swell and contract during cycling may easily damage conventional SEI layers resulting in perpetual self-repairing of these layers and, as a result, capacity fading. Proposed multilayered SEI structures overcome, to a certain degree, the challenge presented by volumetric changes of the high capacity active materials. Further, adhesion of an SEI layer or structure to the active material may influence the electrode performance and, as a result, the performance of the overall cell. If an SEI layer does not adhere well and separates from the active material, an active material surface that is completely or partially free from the SEI layer may get exposed to the electrolyte and lead to formation of new SEI material due to the higher potential of this surface. Adhesion may be improved by utilizing multilayered SEI structures where inner layers may serve as adhesions layers.

The characteristics of SEI layers or structures listed above generally depend on electrode and battery structures, electrode and electrolyte compositions, formation process conditions, and other factors. This document explains how these factors can be controlled to achieve more desirable characteristics of multilayered SEI structures that are functionally and structurally different than conventional SEI layers. For example, multilayered SEI structures help to achieve and combine characteristics that may be not available from a single SEI layer. Specifically, one characteristic may be achieved by forming only one type of SEI layer, while another characteristic may be achieved only by forming different types of layers. Thus, forming a single SEI layer having both of these characteristics may not be achievable. On the other hand, a multilayered SEI structure may combine different types of layers. These layers may vary in their chemical compositions as well as physical structures, e.g., thicknesses, porosities. Furthermore, different layers of multilayered SEI structures may be formed as inner and outer layers. The characteristics and types of inner and outer layers may be selected in such a manner that benefits the overall properties of the multilayered SEI structure. In a specific example, an outer layer may be less ionically permeable than the corresponding inner layer. The outer layer acts as a protective coating, while the inner layer may be more elastic, reducing stress transfer from the active material to the outer layer. In other words, varying properties within the multiple layers of a multilayered SEI structure can provide additional design options and flexibility not previously available with conventional SEI layers.

Cells fabricated with high capacity active materials, such as silicon, tend to exhibit more severe capacity losses during formation and later operational cycling. Such capacity fading is attributable to various factors. For example, high capacity active materials are often in the form of relatively small structures (e.g., nanostructures, nanowires) to reduce the likelihood of fracture. At the same time, smaller structures have a larger surface area available for interaction with the electrolyte. An SEI layer typically forms on any active materials surface that is exposed to the electrolyte and kept at a high potential. Therefore, a larger exposed surface is likely to trap more lithium and cause more electrolyte reduction than, for example, conventional low-surface-area graphite-based cells. Furthermore, high capacity active materials experience larger volume changes during cycling than conventional materials, thereby applying substantial stresses to their SEI layers. If an SEI layer is not sufficiently elastic, it may crack, exposing additional active material surfaces to the electrolyte. As explained above, this damaged area will form a new SEI layer and cause additional loss of lithium and reduction of electrolyte. This volume change and SEI repair may repeat during operation cycling and cause significant capacity fading.

In certain embodiments, a method of fabricating a rechargeable electrochemical cell involves performing formation in a manner that significantly changes one or more processing conditions during formation. For example, formation may follow a controlled temperature profile, a charge/discharge current profile, and/or include change or adjustment of electrolyte composition. These approaches are believed to lead to formation of multilayered SEI structures that have characteristics specifically configured for operating with high capacity active materials. Such characteristics may include high flexibility and stability or, more specifically, mechanical stability. It is believed that different layers in a multilayered SEI structure can act synergistically and perform different functions (e.g., adhesion, ionic permeability, electrical resistance, and/or mechanical flexibility) in the final cell assembly resulting in improvement of the overall cell performance.

A multilayered SEI structure may be specifically configured to be stable and effective on the surface of an active material that undergoes significant volume changes during cycling. The volume changes in question may be on the order of at least about 50% or greater between fully charged and fully discharged states. For example, a charge range for silicon nanostructures can be at least about 1000 mAh/g between fully charged and fully discharged state. It should be noted that a fully discharged state does not necessarily correspond to substantially no lithium in the active material structures. Likewise, a fully charged state does not necessarily correspond to the theoretical capacity of the active material. In the above example, silicon nanostructures may be cycled, for example, between about 1000 mAh/g on one end (i.e., a fully discharged state) of the cycle and about 2000 mAh/g on the other end (i.e., a fully charged state). A multilayered SEI structure may include a flexible/expandable porous layer and a nonporous layer. The porous flexible layer may be used to compensate for the active material's volume changes. It may be an inner layer positioned at the interface with the active material. The nonporous layer prevents additional solvent molecules from reaching the electrode active material surface and may be formed as an outer layer. If this nonporous layer interfaces directly with the dynamic active material, it may crack and allow electrolyte to reach the active material. However, positioning another more flexible layer between the active materials and nonporous layer helps to reduce stress concentration and prevent cracking, at least to a certain degree.

A multilayered SEI structure may be configured to adhere to and provide reliable protection for a substantially rough surface of an active material that can be characterized by cracks, flakes, protrusions, and other surface features. For example, an active material can be formed into silicon nanowires that are about 10-500 nanometers in diameter and about 10-50 micrometers in length. In other embodiments, a silicon coating may be formed on a template having similar dimensions. Some examples of templates materials include silicides (e.g., nickel silicides), carbides, and carbon-containing materials. These silicon nanowires or silicon coating on the template nanostructures may have a certain surface roughness and/or porosity. A rough surface of the active materials results in a larger interface area with electrolyte and may result in more electrolyte reduction on its surface to cover the entire area with the SEI layer. At certain roughness and/or porosity levels a thicker SEI layer is formed for the layer to effectively block various electrolyte components. The thicker SEI layer corresponds to a higher interface impedance and increase the overall resistance of the battery. To minimize this impedance, a multilayered SEI structure may combine, for example, an inner layer, i.e., the layer contacting the active material, which has a high ionic conductivity with an outer layer, i.e., the layer exposed to the electrolyte, which has a low ionic conductivity but a high chemical stability. The inner layer may be substantially thicker than the outer layer, e.g., at least about 2 times thicker, at least about 5 times thicker, or even at least about 10 thicker.

Using a thin outer layer does not substantially impact the overall resistance of the cell. However, a thick inner layer helps to smooth the surface of the active material structures such that the thin outer layer becomes sufficient. Furthermore, having a thicker inner layer helps to reduce stress transfer to the outer layer when the active material structures swell and contract during cycling thereby preserve integrity of the outer layer. The outer thinner layer may include materials that are more chemically stable in the electrolyte environment and at this interface potential than the materials of the inner thick layer. It has been found that certain electrolyte additives or compounds, such as organic silicon based electrolytes, generate more protective but less ionically conductive SEI layers. These additives may be used during formation of the outer layer of a multilayered SEI structure, while the inner layer of that structure may be formed using different electrolyte formulations. Overall, a combination of a highly conductive but less protective inner layer with a less ionically conductive but more protective outer layer forms a multilayered SEI structure that is more protective and less electron resistant than anyone of these layers used independently.

Figure 1:
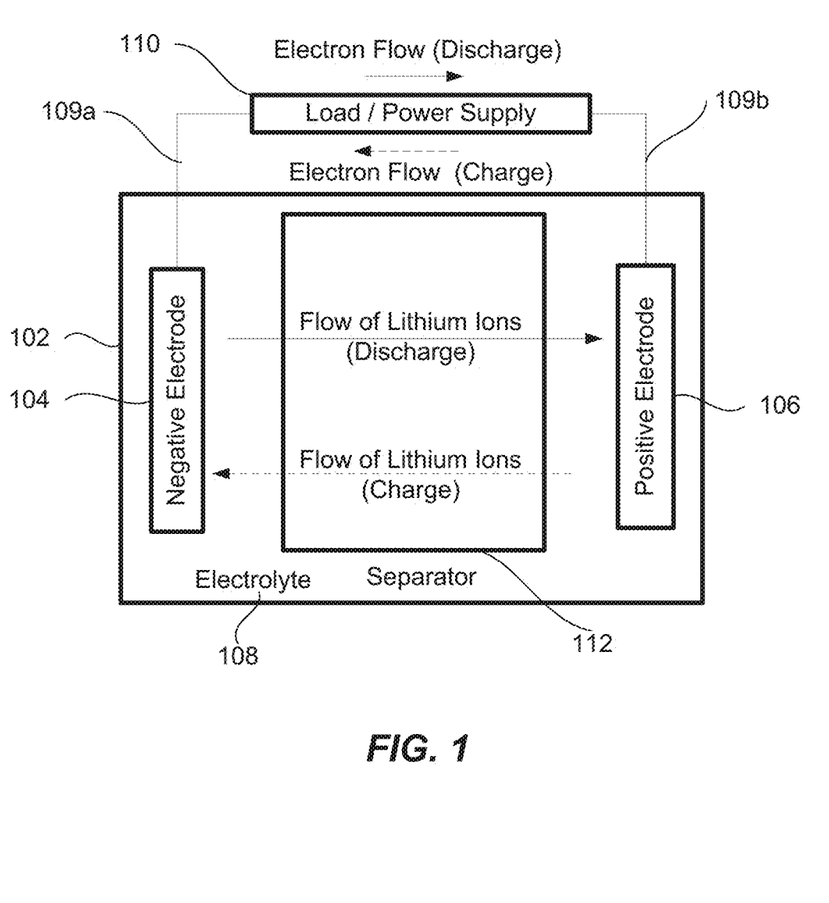
FIG. 1 is a schematic representation of a lithium ion cell, in accordance with certain embodiments.

Certain aspects of electrochemical cell fabrication techniques and structures are best understood in the context of the following description of a lithium ion cell. FIG. 1 is a simplified schematic depiction of a typical lithium ion cell 100 including negative electrode 104, positive electrode 106, separator 112 interposed between positive electrode 106 and negative electrode 104, and electrolyte 108 carrying lithium ions between the two electrodes and through separator 112. In commercial applications, all cell components are enclosed in sealed case 102 with electrical leads or electronically conductive pathways 109a and 109b extending to the exterior of case 102. These conductive pathways connect to a power supply for charging and a load for powering up the load. In some embodiments, portions of case 102 may serve as one or both electrical leads. For example, bottom and side walls of case 102 may be used as a positive terminal, while the top cover, which may be electrically insulated from the rest of the case by an insulating seal, may serve as a negative terminal.

A complete cycle of a rechargeable lithium ion cell includes a charging phase and a discharging phase, sometimes referred to as charging and discharging half-cycles or, simply, charging and discharging cycles. During the charging phase, lithium ions are generated on positive electrode 106 together with a corresponding number of electrons. Externally generated electrical potential forces the electrons to flow from positive electrode 106 to negative electrode 104 where they combine with lithium ions to form lithium atoms stored within the negative active material. This process is sometimes referred to as lithiation of the negative active material. Transferring lithium ions into the negative active material structures prevents formation of metallic lithium in the cell. In embodiments, the resulting charged silicon based active material has stoichiometry of $Li_{4.4X}Si$, where X may have values between about 0 and 1, with 1 representing silicon charged to its maximum theoretical capacity of about 4200 mAh/g. A combined reaction for a lithium ion cell having the lithium cobalt oxide on the positive electrode and the silicon on the negative electrode is shown in the equation below where the left side of the equation represents the cell in the discharge state and the right side represents the same cell in the charged state:

$$4.4LiCoO_2 + Si \leftrightarrows 4.4Li_{1-X}CoO_2 + Li_{4.4X}Si$$

During the discharge cycle, the negative active material loses electrons and releases lithium ions into the electrolyte. These ions are transported to the positive electrode. Thus, during the discharge of the cell, electrons flow from negative electrode 104 to positive electrode 106 supplying power to external load 110. The charging and discharging phases may be repeated many times in rechargeable lithium ion cells. A typical cycle-life of a lithium ion cells may be in the hundreds or thousands of cycles, as dictated by the minimum allowable capacity of the cell.

Figure 2:
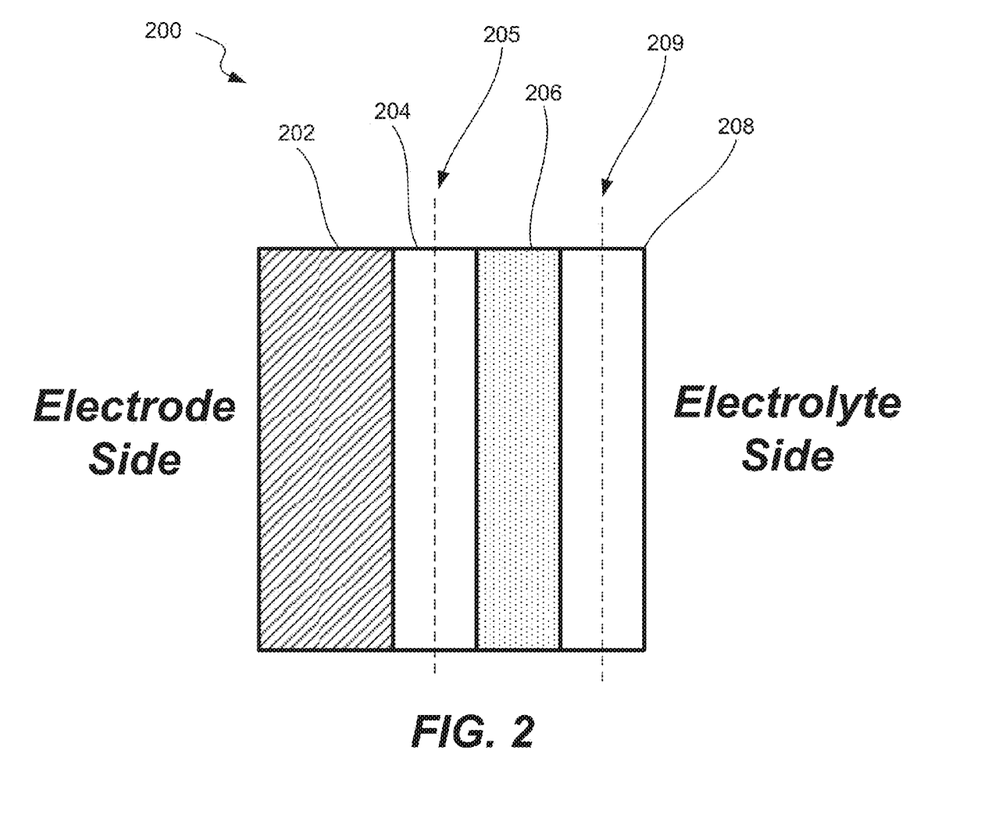
FIG. 2 is a schematic representation of a multilayered SEI structure, in accordance with certain embodiments.

FIG. 2 is a schematic representation of a multilayered SEI structure 200 in accordance with certain embodiments. Structure 200 is shown to include three layers 204, 206, and 208 attached to an active material structure 202. In general, multilayered SEI structure 200 may include any number of layers, e.g., two, three, four, five, and so on. For simplicity, this description refers primarily to two layers, i.e., an inner layer 204 contacting the active material and an outer layer 208 contacting electrolyte. However, these two layers may have any numbers of additional layers in between. Multiple layers often do not have well-defined boundaries, and two adjacent layers may often have a blended region with a gradient of composition between each other as a boundary. In these situations, each layer may be characterized by a plane extending through its center parallel to its boundaries. Examples of such planes are shown on edge in FIG. 2 as 205 for layer 204 and as 209 for layer 208. Material compositions and/or their physical properties at these planes are different for different layers even though boundaries of these layers are not necessarily crisp.

Each layer in a multilayered SEI structure may have a different composition and/or structure and, as a result, different characteristics/functions. To achieve these differences each layer may be formed using particular materials (e.g., electrolyte and electrode surface compositions present during formation of each layer) and conditions during formation (e.g., cell temperatures, charge/discharge current rates). Multiple layers may be formed with different thicknesses, e.g., between about 1 nanometers and 100 nanometers or, more particularly between about 5 nanometers and 50 nanometers.

For example, a multilayered SEI structure may have one flexible/expandable layer and another relatively nonporous layer. The non-porous layer is typically, though not necessarily, an outer layer, i.e., a layer exposed to the electrolyte. The nonporous layer may have properties that prevent electrolyte solvent molecules from reaching electrode areas that are at a higher potential than the exposed surface of the SEI layer, for example, the flexible/expandable layer. This prevents further electrolyte reduction and additional SEI formation. The non-porous layer may include boron-based salts, like lithium bis (oxalato)borate (LiBOB). Such salts are believed to be highly protective and allow very little electrolyte penetration through the layer. Other examples of non-porous layer materials include the reduction products of ethylene carbonate. Ethylene carbonate based electrolytes tend to form a more compact SEI layer in comparison to a layer formed using propylene carbonate based electrolytes. Without being restricted to any particular theory, it is believed that a dangling methyl group on propylene carbonate prevents compact film formation, while various ethylene carbonate reduction products pack very closely together. High capacity active materials typically show significant swelling, which requires an SEI layer with certain flexibility. This could be achieved by integrating two or more compounds.

The flexible layer may be relatively porous, at least in comparison to the non-porous layer described above. The flexible layer includes, in certain embodiments, a polymer, elastomer, or other relatively high molecular weight component. Thus, in specific embodiments, the flexible layer is formed by including an additive with a polymerizable or cross-linkable moiety in the electrolyte used during at least a portion of formation. In a specific embodiment, the formation electrolyte includes a carbonate with a polymerizable moiety, such as vinylene carbonate. In this example, the vinylene carbonate is reductively polymerized to form poly-vinylene carbonate as well as other reduction products. The polymerized species are believed to impart flexibility to the SEI sub-layer, which flexibility is sufficient to accommodate the volume changes associated with charging and discharging of high capacity materials such as silicon. In certain embodiments, a porosity of the flexible layer may be between about 10% and 90% or, more specifically, between about 30% and 60%. In the same or other embodiments, elasticity of the flexible layer may be between about 50% and 400% without breakage or, more specifically, between about 100% and 300%.

In addition to or instead of different electrolyte compositions used to form porous and non-porous layers, formation process conditions can be varied. For example, a first formation phase may be performed at a lower temperature (e.g., at about room temperature) and a relative high current (e.g., at about 1C or C/2). Then a second formation phase may be performed at a higher temperature (e.g., at about 40-50° C.) but a lower current (e.g., about C/4 or about C/10). In certain embodiments, much lower charge and discharge rates may be used, e.g., less than about C/10, such as about C/20. These and other examples will be now described with reference to a fabrication process and FIG. 3.

Figure 3:
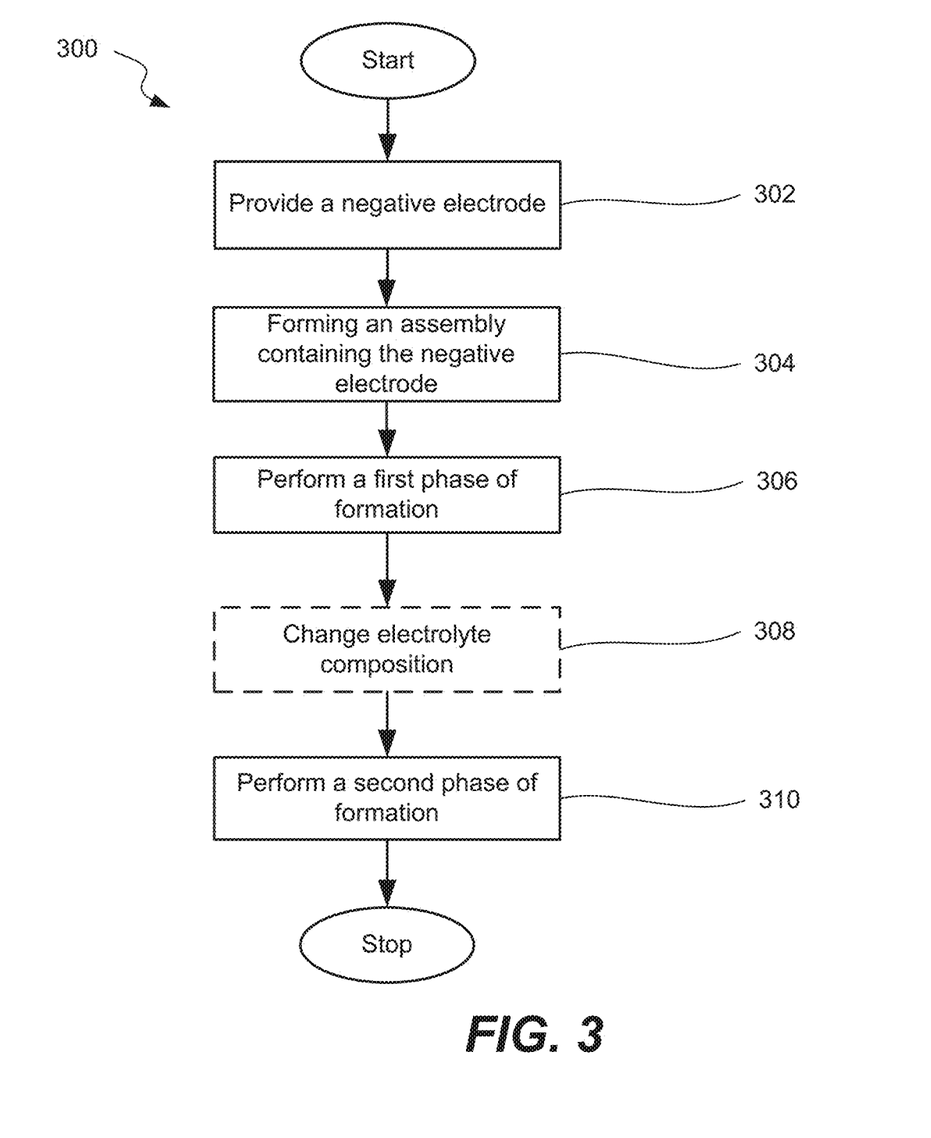
FIG. 3 is a process flowchart corresponding to a method of fabricating an electrochemical cell containing a multilayered SEI structure, in accordance with certain embodiments.

FIG. 3 is a process flowchart corresponding to method 300 for fabricating an electrochemical cell assembly, in accordance with certain embodiments. At an operation 302, a negative electrode containing high capacity active material is provided. A negative electrode may include one or more high capacity active materials, such as silicon, germanium, tin, tin oxide, titanium oxide, carbon, a variety of metal hydrides (e.g., $MgH_2$), silicides, phosphides, and nitrides. Other examples of active materials and their combinations include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon. High capacity active materials are generally defined as active materials with theoretical lithiation capacities of at least about 1000 mAh/g. In certain embodiments, a portion of high capacity active materials in the active layer is at least about 50%, or at least about 75%, or at least about 80%, or at least about 85%, or at least about 90% relative to the total amount of the negative active materials. Other materials in the active layer may include other active materials, conductive additives, binder, and alike. Doped and non-stoichiometric variations of these materials may be used as well. In certain embodiments, active materials may be arranged in core-shell structures with other active or inactive materials. Core materials are typically different from shell materials. Furthermore, when multiple cores are used, each pair of two adjacent cores typically would have different materials and/or morphology. However, in certain embodiments, materials may be different based only on their morphological structure (e.g., a crystalline silicon core and an amorphous silicon shell or vice versa). In certain embodiments, a core includes carbon while a shell includes silicon. In other embodiments, a core includes silicon while a shell includes carbon. In certain embodiments, the lithium concentration in the core is on average greater that the lithium concentration in the shell. In other embodiments, the lithium concentration in the core is on average less than the lithium concentration in the shell.

The high capacity active material may be in various forms, such as a uniform thin layer, particles bound to the substrate with the polymeric binder, substrate-rooted nanostructures, and other forms and structures. In certain embodiments, the high capacity active materials are substrate-rooted nanostructures. These nanostructures are physically attached to the substrate and are in electronic communication with the substrate. The substrate may serve as a current collector for the electrode. Nanostructures may be rooted to the substrate at random locations (randomly rooted), or rooted preferentially at some particular location (non-randomly rooted). Example of non-randomly rooted nanostructures include terminally rooted nanostructures (e.g., nanowires and nanorods) and medially rooted nanostructures preferentially affixed to the substrate at medial positions (rather than a terminal position) further described in U.S. patent application Ser. No. 12/437,529 filed on May 7, 2009, which is incorporated by reference herein in its entirety for the purpose of describing nanostructures.

In certain embodiments, high capacity active materials are formed as a thin layer over a conductive template extending from the surface of the conductive substrate. Some examples of templates include nanowires, nanotubes, particles, and films. In certain embodiments, templates are silicide nanowires, more specifically, silicide nanowires that are growth-rooted to the conductive substrate. Various examples of templates are described in U.S. patent application Ser. No. 13/039,031, entitled "TEMPLATE ELECTRODE STRUCTURES FOR DEPOSITING ACTIVE MATERIALS," filed on Mar. 2, 2011 and U.S. patent application Ser. No. 13/114,413, entitled "MULTIDIMENSIONAL ELECTROCHEMICALLY ACTIVE STRUCTURES FOR BATTERY ELECTRODES," filed on May 24, 2011, which are incorporated herein by reference in their entireties for all purposes.

In some embodiments, the negative electrode may have a functionalized surface specifically configured to form a multi-layered SEI structure. For example, certain materials (e.g., catalyst) may be deposited on an electrode surface prior to contacting an electrolyte. Certain catalysts form a specialized SEI structure immediately upon contacting an electrolyte, which structure then may be at least partially modified during subsequent formation. In certain embodiments, a functionalized surface provides chemically initiation of desired reactions during SEI formation, e.g., a polymerization or cross-linking reaction that is initiated or controlled by radical-based chemical reactions. In the same or other embodiments, at least some of this initial material may remain in its original form, while the remainder is modified during SEI formation. In another example, a thin layer of carbon is deposited on a surface of a high capacity active material (e.g., silicon). Further, a functionalized surface may be a partially formed SEI layer. For example, a negative electrode may be inserted into a "processing" cell and subjected to partial SEI formation before being assembled into a final cell assembly. In the same or other embodiments, a functionalized surface may be formed by physical evaporation of certain materials onto the surface of the active material in the electrode.

Referring again to FIG. 3, at 304, a first assembly including the negative electrode, a positive electrode, and an initial electrolyte is formed. A positive electrode of the first assembly may remain and become a part the final cell assembly. Examples of positive active materials include $Li(M'_XM''_Y)O_2$, where M' and M" are different metals (e.g., $Li(Ni_XMn_Y)O_2$, $Li(Ni_{1/2}Mn_{1/2})O_2$, $Li(Cr_XMn_{1-X})O_2$, $Li(Al_XMn_{1-X})O_2$), $Li(Co_XM_{1-X})O_2$, where M is a metal, (e.g. $Li(Co_XNi_{1-X})O_2$ and $Li(Co_XFe_{1-X})O_2$), $Li_{1-W}(Mn_XNi_YCo_Z)O_2$, (e.g. $Li(Co_XMn_YNi_{(1-X-Y)})O_2$, $Li(Mn_{1/3}Ni_{1/3}Co_{1/3})O_2$, $Li(Mn_{1/3}Ni_{1/3}Co_{1/3-X}Mg_X)O_2$, $Li(Mn_{0.4}Ni_{0.4}Co_{0.2})O_2$, $Li(Mn_{0.1}Ni_{0.1}Co_{0.8})O_2$), $Li_{1-W}(Mn_XNi_XCo_{1-2X})O_2$, $Li_{1-W}(Mn_XNi_YCoAl_W)O_2$, $Li_{1-W}(Ni_XCo_YAl_Z)O_2$ (e.g., $Li(Ni_{0.8}Co_{0.15}Al_{0.05})O_2$), $Li_{1-W}(Ni_XCo_YM_Z)O_2$, where M is a metal, $Li_{1-W}(Ni_XMn_YM_Z)O_2$, where M is a metal, $Li(Ni_{X-Y}Mn_YCr_{2-X})O_4$, $LiM'M''_2O_4$, where M' and M" are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $LiNiCuO_4$, $LiMn_{1-X}Al_XO_4$, $LiNi_{0.5}Ti_{0.5}O_4$, $Li_{1.05}Al_{0.1}Mn_{1.85}O_{4-Z}F_Z$, $Li_2MnO_3$) $Li_XV_YO_Z$, e.g. $LiV_3O_8$, $LiV_2O_5$, and $LiV_6O_{13}$, LiMPO4 where M is a metal; lithium iron phosphate ($LiFePO_4$) is a common example. It is both inexpensive and has high stability and safety, because the relatively strong phosphate bonds tend to keep the oxygen in the lattice during overcharge, but has poor conductance and require substantial amounts of conductive additives, $LiM_XM''_{1-X}PO_4$ where M' and M" are different metals (e.g. $LiFePO_4$), $LiFe_XM_{1-X}PO_4$, where M is a metal, $LiVOPO_4Li_3V_2(PO_4)_3$, $LiMPO_4$, where M is a metal such as iron or vanadium. Further, a positive electrode may include a secondary active material to improve charge and discharge capacity, such as $V_6O_{13}$, $V_2O_5$, $V_3O_8$, $MoO_3$, $TiS_2$, $WO_2$, $MoO_2$, and $RuO_2$.

As mentioned above, an assembly formed in 304 includes an initial electrolyte, which may later be replaced in an optional operation 308. Examples of solvents that may be present in the initial electrolyte include cyclic carbonates (e.g., ethylene carbonate (EC) and propylene carbonate (PC)), linear carbonates (e.g., dimethyl carbonate (DMC), diethyl carbonate (DEC), and ethylmethyl carbonate (EMC)), fluorinated versions of the cyclic and linear carbonates (e.g., monofluoroethylene carbonate (FEC)). Furthermore, non-carbonate solvents, such as sulfones, nitriles, dinitriles, carboxylates, and ethers, may be used. Examples of salts that may be present in the initial electrolyte (and dissolved in the above listed solvents) include lithium hexafluorophosphate ($LiPF_6$), lithium hexafluoroarsenate (LiAsF), lithium tetrafluoroborate ($LiBF_4$), lithium bis(oxalato)borate (LiBOB), lithium oxalyldifluoroborate (LiODFB), lithium pentafluoroethyltrifluoroborate (LiFAB), and lithium tris(pentafluoroethyl)-trifluorophosphate (LiFAP). Examples of additives that may be present in the initial electrolyte include vinylene polymerizable additives (e.g., vinylene carbonate, vinyl ethylene carbonate) furan polymerizable additives (e.g., furan, cyanofuran), isocyanates polymerizable additives (e.g., phenyl isocyanates). Other examples of electrolyte components are listed below.

In certain embodiments, an initial electrolyte includes LiBOB (e.g., at a molar concentration of between about 0.2 to 0.7M) mixed in EC with a combination of DMC, DEC, and/or EMC, such that a weight ratio of EC is at least about 50%. Generally, any relative weight ratios of DMC, DEC, and EMC may be used. It has been found that LiBOB generally provides desirable SEI formation characteristics when used with silicon based electrodes. When LiBOB is used, the resulting SEI layer generally contains some boron species. However, LiBOB containing electrolytes tend to have low conductivity and may be unstable for long cycling, especially, with cobalt containing positive electrodes. As such, in certain embodiments, a LiBOB containing electrolyte is used during initial formation phase or entire formation (i.e., as an initial electrolyte) and then replaced with more conductive electrolytes that may or may not contain boron (i.e., the replacement electrolyte). The initial formation may be performed at a cell temperature of between about 30° and 60° C. Various examples of replacement electrolytes are presented below.

In certain embodiments, an initial electrolyte may include LiBOB (e.g., at a molar concentration of between about 0.2 to 0.7M) and about 100% by weight of PC or about 50% by weight of PC and a combination of DMC, DEC, and/or EMC in the remaining 50%. Generally, any relative weight ratios of DMC, DEC, and EMC may be used in this remaining portion. The initial formation may be performed at a cell temperature of between about 30° and 60° C. In this example, PC may be partially or fully replaced with FEC or a combination of EC and FEC containing, for example, between about 10 weight percent and 75 weight percent of FEC or, more specifically, about 50 weight percent of FEC, and a remaining portion containing EC. When a combination of PC and FEC is used to replace PC, the weight ratio of FEC in this combination may be between about 10% and 75%.

In the examples presented above LiBOB may be fully or partially replaced with LiODFB. Similar to LiBOB, LiODFB helps to form boron rich SEI layers generally does not provide adequate conductivity to be used in the operating electrolyte, e.g., replacement electrolyte. Ratios of LiODFB in the initial electrolyte may be similar to ratios of LiBOB electrolyte presented above. Another salt option for the initial electrolyte is Lithium Bis(Trifluoromethanesulfonyl) Imide (i.e., LiTFSI), which may be used in molar concentrations of 0.5M to 1.2M in solvent mixtures similar to the ones presented above. LiTFSI provides good SEI forming characteristics but may corrode aluminum, which is commonly used as a substrate for positive electrodes and various case components. As such, LiTFSI may not be suitable for use in an operational electrolyte, while it may still be used temporarily in the intermediate electrolyte. For example, LiTFSI at concentrations of between about 0.5M-1.2M may be used in ether-based mixtures with 1,3-dioxolane and dimethoxyethane. Dioxolane weight range may be from 50% to 100%. Ethers may be helpful during SEI formation but are generally unstable at typical positive electrode voltages. Replacing ether based electrolytes after partial or full SEI formation may be used to form multilayered SEI structure with desirable characteristics while avoiding the long-term cycling issues during operation of the cell.

An initial electrolyte may include between about 0.1M-1.0M of LiTFSI in one or more of the following ionic liquids: n-alkyl,1-methyl-pyrrolidinium bis(trifluoromethanesulfonyl)imide (PYR1n-TFSI), where n=propyl or butyl; n-alkyl-1-methyl-piperidinium-bis(trifluoromethanesulfonyl)imide (PPD1n-TFSI) where n=propyl or butyl; ionic liquids with phosphonium cations and TFSI anions such as trihexyl-tetradecyl-phosphonium bis(trifluoromethanesulfonyl)imide.

A few addition initial electrolyte examples include LiBOB (e.g., between about 0.2 to 0.7M) combined with a solvent mixture containing FEC or a combination of FEC and PC and at least about 50 weight percent of a combination of DMC, DEC, and/or EMC. The initial formation may be performed at a cell temperature of between about 30° C. and 60° C. FEC may be also combined with EC, such that a weight ratio of FEC in this combination is between about 10% and 75%. This combination is further mixed with at least about 50 weight percent of a combination of DMC, DEC, and/or EMC. An initial electrolyte may include between about 0.2M-1.2M of LiPF6 in FEC, a combination of PC and FEC, or a combination of EC and FEC, without adding any linear carbonates to these electrolyte formulations.

Replacement electrolytes may be introduced into cells to replace initial electrolytes during formation (e.g., in between the first formation phase and second formation phase) or after formation is completed. When a replacement electrolyte is introduced during formation, some additional formation cycling may be performed with this new replacement electrolyte. Alternatively, a replacement electrolyte may be introduced into the cell after completing formation cycling and the cell (with the new replacement electrolyte) is ready for operation cycling, which is generally much less controllable than formation cycling. Generally, replacement electrolytes have higher conductivity than initial electrolytes.

One example of replacement electrolyte formulations includes a mixture of LiPF6 (e.g., between about 1.0M-1.5M) in EC (e.g., between about 25% and 50% by weight) and DMC, DEC, and/or EMC. EC may be partially or fully replaced with PC. FEC may be added to EC, which a FEC weight ratio of between about 2% and 10%. In certain embodiments, FEC may partially and even fully replace EC. In a similar manner, FEC may be added to PC (that fully or partially replaces EC as indicated aboce), with a FEC weight ratio of between about 2% and 10%, and in certain embodiments, up to 50%. Vinylene carbonate (VC) and vinyl ethylene carbonate (VEC) may be added to the above formations with weight ratio of these additives being between about 0.1% and 2.0%. In the same or other embodiments, between about 0.5 weight percent and 10 weight percent of dimethyl carbonate, diethyl carbonate, and/or ethylmethyl carbonate may be added to the above formulations. Other additives to the replacement electrolyte formulations presented above may include between about 0.1 weight percent and 5 weight percent of succinic anhydride and/or between about 0.05 weight percent and 1.0 weight percent of tris(pentafluorophenyl) borane.

The assembly formed at 304 may be a stack, jellyroll, or other arrangements. Some examples are described below in more details. This assembly may later be used in a final cell or taken apart and form other assembly. For example, it may be difficult to change certain types of electrolytes in certain types of cell assemblies. Electrodes and separators get soaked with electrolyte. However, an initial electrolyte formulation may be later sufficiently modified by introducing some additional electrolyte solution into the system.

A process may continue with performing a first phase of formation at 306. A first part may be a complete charge-discharge cycle or multiple charge-discharge cycles or some portions of the initial or subsequent charging half-cycle. For, example, the first phase may be stopped during the first or some subsequent charge parts of charge-discharge cycles or during the discharge parts. In other words, the end of the first phase does not necessarily have to correspond to a fully charged or a fully discharged cell (i.e., based on its operational capacity). In certain embodiments, the end of the first phase corresponds to a fully charged or a fully discharged cell. Similarly, a second phase (block 310) of the formation may include a complete charge-discharge cycle or multiple charge-discharge cycles or may complete parts of the charge-discharge cycle left after the first phase. In a specific example, a negative electrode is lithiated to at least about 50% or, more specifically, to at least about 75% of its operating capacity during the initial phase (operation 306) at which point this operation is deemed complete. Additional lithiation then continues in the next phase (i.e., operation 310).

Typically, the first formation phase (operation 306) is performed at different processing conditions than the second formation phase (operation 310). This variation in formation schemes is designed to form a multilayered SEI structure. It also provides more flexibility in controlling the physical and chemical properties of the resulting multilayered SEI structure. Formation of each layer in a multilayered SEI structure may be based on the following illustrative processes or their combinations. One example includes electrochemically initiated or controlled formation, e.g., reduction, cross linkage, or polymerization reactions in SEI formation. These reactions may be initiated or controlled by application of a specific voltage and/or current to cell terminals during formation.

Another example involves thermally initiated or controlled formation, e.g. cross linkage or decomposition reactions that are initiated or controlled by heat. For example, a first formation part may be performed at a lower temperature than the second formation part. Additional chemical reactions may occur during the second part because of the higher temperature.

Formation of different layers of a multilayered SEI structure may be carried out in the same electrolyte solution or in different electrolyte solutions that are sequentially used to build desired properties into each layer. Changing the electrode solution gives additional control over the chemistry of the deposited layers. In other words, process 300 may involve an optional operation 308 of changing the electrolyte composition. This operation may involve at least partial removal of the initial electrolyte and addition of a new electrolyte or electrolyte components, which may be repeated multiple times. In more specific embodiments, only new components are added to the initial electrolyte. Generally, an initial electrolyte includes certain substances that help to form a protective interface layer that may have a high impedance. Only one phase of the overall formation process may be performed using this initial electrolyte to prevent substantial impedance build-ups, e.g., operation 306. Another phase may be performed using different kinds of electrolytes. Furthermore, an initial electrolyte may include some substances that help to form a stable protective interface layer but may not compatible with some positive electrode active materials. Some examples of additives that can be used in an initial electrolyte include boron based substances, e.g., base salts or additives, such as LiBOB and LiODFB. A final electrolyte may be a standard electrolyte with or without silicon based additives. A final formulation may also include a fluoro-ethylene carbonate (FEC) additive, e.g., EC/DMC 50/50, 1M LiPF6, FEC (1-20%).

In certain embodiments, an initial SEI formation step is combined with a pre-lithiation process. Furthermore, in certain embodiments, operation 310 is not performed or, more specifically, no additional cycling is performed during operation 310. For example, all formation cycling is performed with an initial electrolyte. The electrolyte is then replaced or its composition otherwise adjusted, at which point the cell is ready for operational cycling without conducting any further formation cycling. In other embodiments, additional formation cycling is performed after the electrolyte is replaced or otherwise modified.

Figure 4:
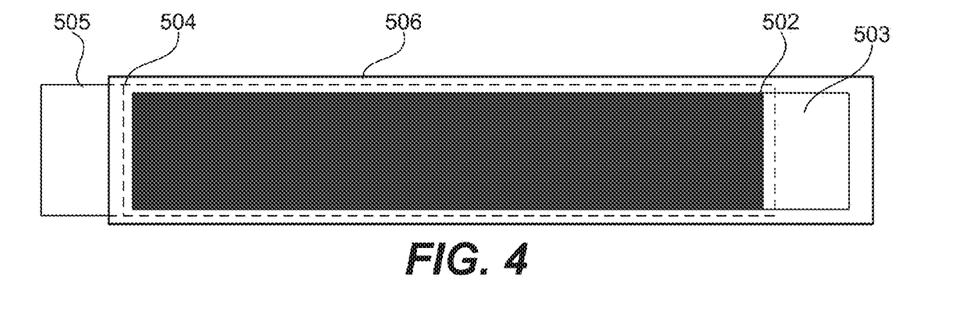
FIG. 4 is a side schematic view of an illustrative electrode arrangement, in accordance with certain embodiments.

FIG. 4 is a plan view of a partially-assembled electrochemical cell that uses electrodes described herein, according to certain embodiments. The cell has a positive electrode active layer 502 that is show covering a major portion of a positive current collector 503. The cell also has a negative electrode active layer 504 that is show covering a major portion of a negative current collector 505. Between the positive electrode active layer 502 and the negative electrode active layer 504 is a separator 506.

In one embodiment, the negative electrode active layer 504 is slightly larger than the positive electrode active layer 502 to ensure trapping of the lithium ions released from the positive electrode active layer 502 by the active material of the negative active layer 504. In one embodiment, the negative active layer 504 extends at least between about 0.25 and 5 mm beyond the positive active layer 502 in one or more directions. In a more specific embodiment, the negative layer extends beyond the positive layer by between about 1 and 2 mm in one or more directions. In certain embodiments, the edges of the separator 506 extend beyond the outer edges of at least the negative active layer 504 to provide complete electronic insulation of the negative electrode from the other battery components.

Figure 5:
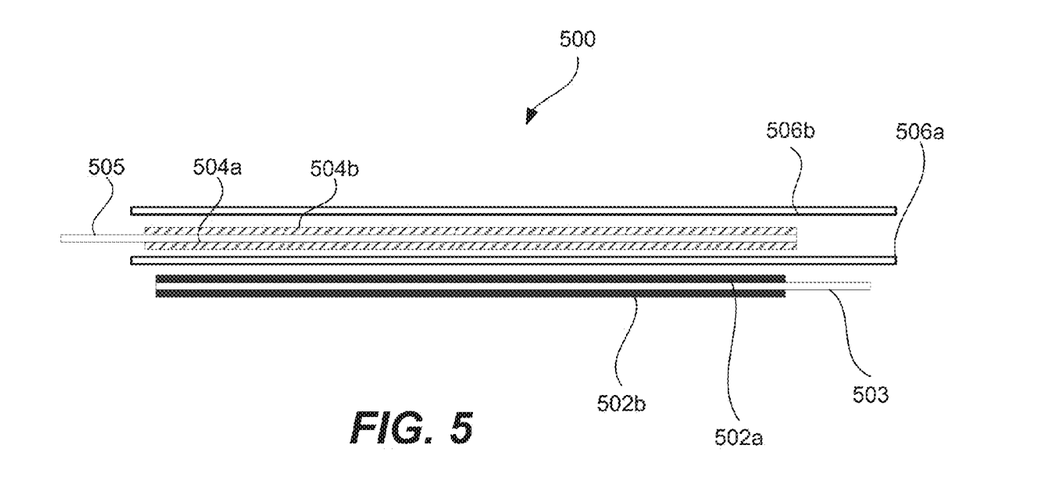
FIG. 5 is a side schematic view of an illustrative electrode arrangement, in accordance with certain embodiments.

FIG. 5 is a cross-section view of an electrode stack 500 of the partially-assembled electrochemical cell that uses electrodes described herein, according to certain embodiments. There is a positive current collector 503 that has a positive electrode active layer 502a on one side and a positive electrode active layer 502b on the opposite side. There is a negative current collector 505 that has a negative electrode active layer 504a on one side and a negative electrode active layer 504b on the opposite side. There is a separator 506a between the positive electrode active layer 502a and the negative electrode active layer 504a. The separator 506 serves to maintain mechanical separation between the positive electrode active layer 502a and the negative electrode active layer 504a and acts as a sponge to soak up liquid electrolyte (not shown) that will be added later. The ends of the current collectors 503, 505 on which there is no active material can be used for connecting to the appropriate terminal of a cell (not shown).

The electrode layers 502a, 504a, the current collectors 503, 505, and the separator 506a together can be said to form one electrochemical cell unit. The complete stack 500 shown in FIG. 5, includes the electrode layers 502b, 504b and the additional separator 506b. The current collectors 503, 505 can be shared between adjacent cells. When such stacks are repeated, the result is a cell or battery with larger capacity than that of a single cell unit.

Figure 6A:
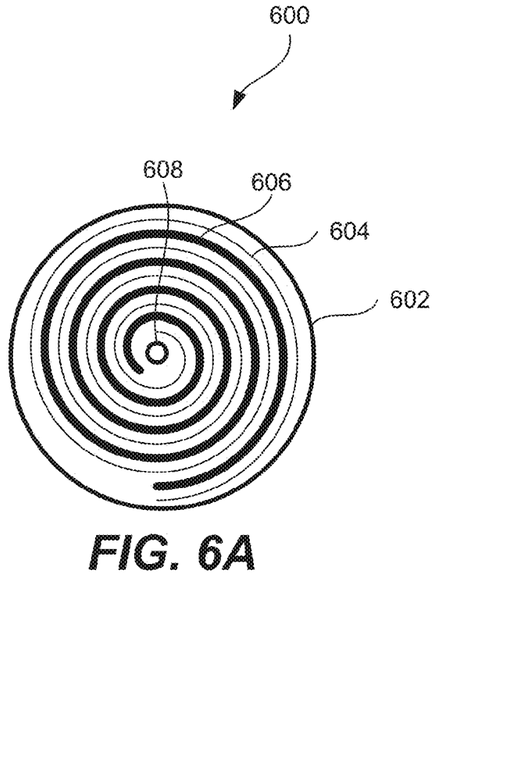
FIGS. 6A-B are top schematic views and a perspective schematic view of an illustrative round wound cell, in accordance with certain embodiments.
Figure 6B:
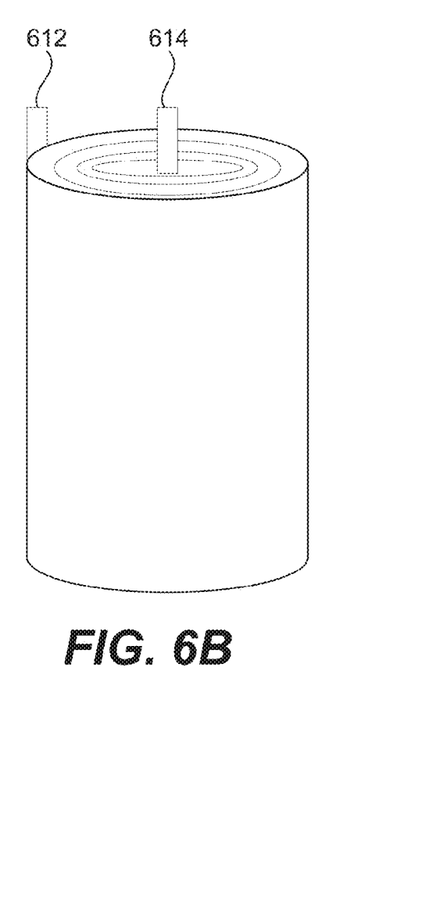

Another way to make a battery or cell with large capacity is to make one very large cell unit and wind it in upon itself to make multiple stacks. The cross-section schematic illustration in FIG. 6A shows how long and narrow electrodes can be wound together with two sheets of separator to form a battery or cell, sometimes referred to as a jellyroll 600. The jellyroll is shaped and sized to fit the internal dimensions of a curved, often cylindrical, case 602. The jellyroll 600 has a positive electrode 606 and a negative electrode 604. The white spaces between the electrodes are the separator sheets. The jelly roll can be inserted into the case 602. In some embodiments, the jellyroll 600 may have a mandrel 608 in the center that establishes an initial winding diameter and prevents the inner winds from occupying the center axial region. The mandrel 608 may be made of conductive material, and, in some embodiments, it may be a part of a cell terminal. FIG. 6B shows a perspective view of the jelly roll 600 with a positive tab 612 and a negative tab 614 extending from the positive current collector (not shown) and the negative current collector (not shown), respectively. The tabs may be welded to the current collectors.

The length and width of the electrodes depend on the overall dimensions of the cell and thicknesses of the active layers and the current collectors. For example, a conventional 18650 cell with 18 mm diameter and 65 mm length may have electrodes that are between about 300 and 1000 mm long. Shorter electrodes corresponding to lower rate/higher capacity applications are thicker and have fewer winds.

A cylindrical design may be used for some lithium ion cells especially when the electrodes can swell during cycling and thus exert pressure on the casing. It is useful to use a cylindrical casing that is as thin as possible while still able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets generally should be avoided within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 7:
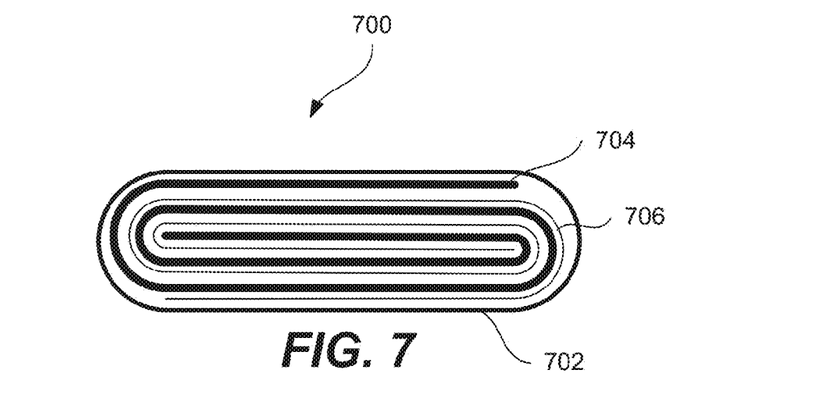
FIG. 7 is a top schematic view of an illustrative prismatic wound cell, in accordance with certain embodiments.

FIG. 7 illustrates a top view of a wound prismatic jellyroll 700. The jellyroll 700 includes a positive electrode 704 and a negative electrode 706. The white space between the electrodes is the separator sheet. The jelly roll 700 is enclosed in a rectangular prismatic case 702. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
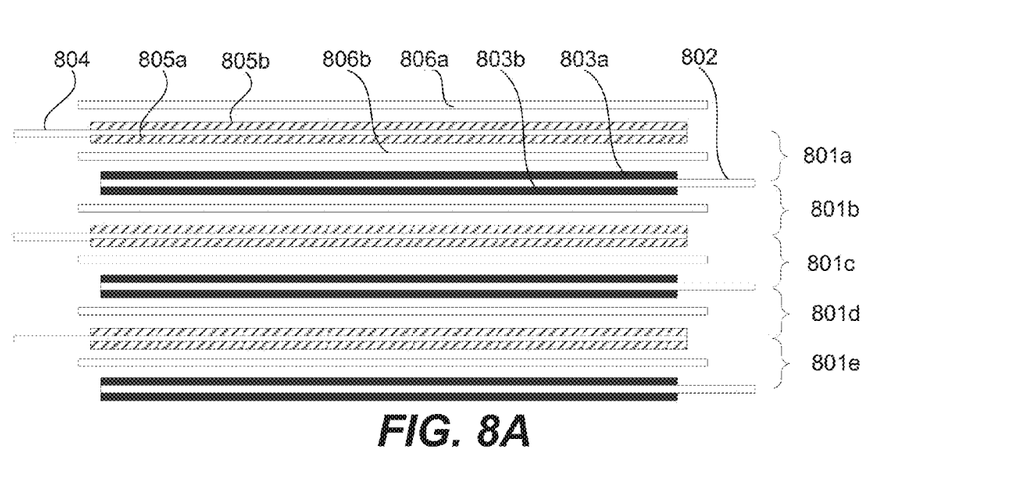
FIGS. 8A-B are a top schematic view and a perspective schematic view of an illustrative stack of electrodes and separator sheets, in accordance with certain embodiments.
Figure 8B:
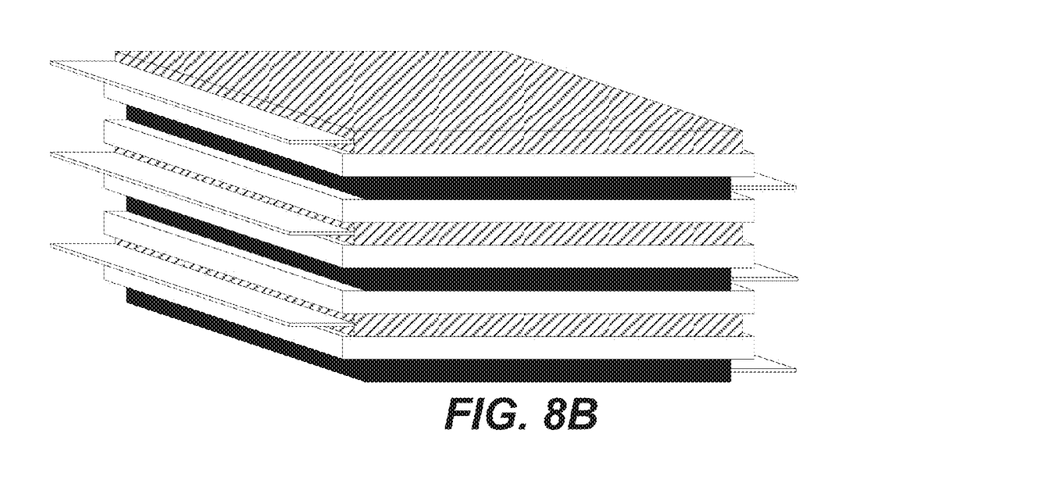

FIG. 8A illustrates a cross-section of a stacked cell that includes a plurality of cells (801a, 801b, 801c, 801d, and 801e), each having a positive electrode (e.g., 803a, 803b), a positive current collector (e.g., 802), a negative electrode (e.g., 805a, 805b), a negative current collector (e.g., 804), and a separator (e.g., 806a, 806b) between the electrodes. Each current collector is shared by adjacent cells. One advantage of stacking cells is that the stack can be made in almost any shape, which is particularly suitable for prismatic batteries. The current collector tabs typically extend from the stack and lead to a battery terminal. FIG. 8B shows a perspective view of a stacked cell that includes a plurality of cells.

Once the electrodes are arranged as described above, the battery is filled with electrolyte. The electrolyte in lithium ions cells may be liquid, solid, or gel. Lithium ion cells with the solid electrolyte are also referred to as a lithium polymer cells.

A typical liquid electrolyte includes one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-*angelica* lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid non-aqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as Polyvinylidene fluoride (PVDF) or chloride or copolymer of their derivatives, Poly(chlorotrifluoroethylene), poly(ethylene-chlorotrifluoro-ethylene), or poly(fluorinated ethylene-propylene), Polyethylene oxide (PEO) and oxymethylene linked PEO, PEO-PPO-PEO crosslinked with trifunctional urethane, Poly(bis(methoxy-ethoxy-ethoxide))-phosphazene (MEEP), Triol-type PEO crosslinked with difunctional urethane, Poly((oligo)oxyethylene)methacrylate-co-alkali metal methacrylate, Polyacrylonitrile (PAN), Polymethylmethacrylate (PNMA), Polymethylacrylonitrile (PMAN), Polysiloxanes and their copolymers and derivatives, Acrylate-based polymer, other similar solvent-free polymers, combinations of the foregoing polymers either condensed or cross-linked to form a different polymer, and physical mixtures of any of the foregoing polymers. Other less conductive polymers may be used in combination with the above polymers to improve strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 9:
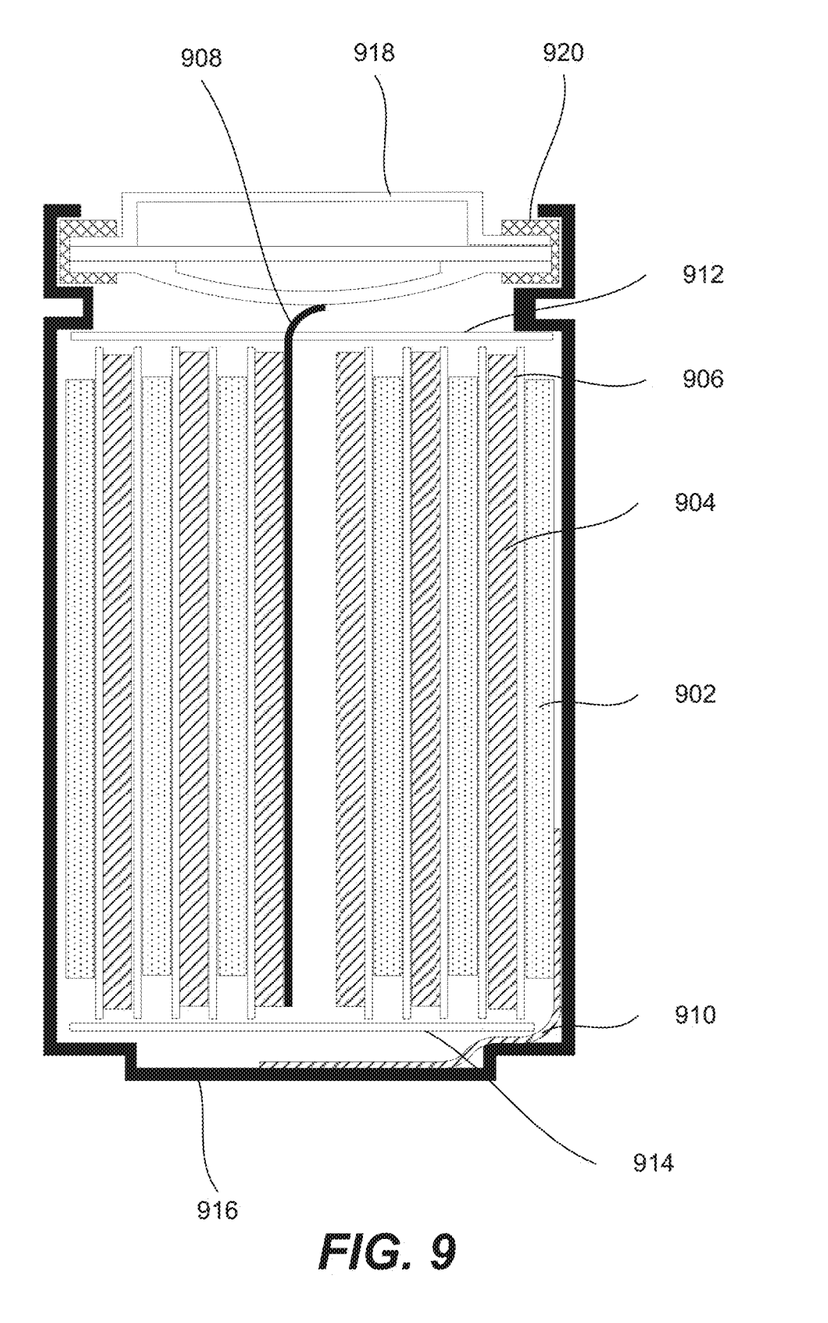
FIG. 9 is a schematic cross-section view of an example of a wound cell, in accordance with embodiments.

FIG. 9 illustrates a cross-section view of the wound cylindrical cell in accordance with one embodiment. A jelly roll includes a spirally wound positive electrode 902, a negative electrode 904, and two sheets of the separator 906. The jelly roll is inserted into a cell case 916, and a cap 918 and gasket 920 are used to seal the cell. In some cases, cap 918 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may be used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

A lithium ion battery, which may form or be part of a cell pack or a battery pack, includes one or more lithium ion electrochemical cells, each containing electrochemically active materials. In addition to the cells, a lithium ion battery may also include a power management circuit to control balance power among multiple cells, control charge and discharge parameters, ensure safety (thermal and electrical runaways), and other purposes. Individual cells may be connected in series and/or in parallel with each other to form a battery with appropriate voltage, power, and other characteristics.

In addition to rechargeable battery applications described above, multilayered SEI structures could be used in electrochemical sensors, superconductors, other battery types where a passivation layer is required, such as lithium metal, sulfur, lithium/air cells.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An electrode of an electrochemical cell, the electrode comprising:
   an electrochemically active structure comprising a high capacity active material; and
   a multilayered SEI structure formed on a surface of the electrochemically active structure, the multilayered SEI structure comprising:
   an inner SEI layer over the electrochemically active structure; and
   an outer SEI layer over the inner SEI layer,
   wherein the inner SEI layer has a different composition and/or morphology than the outer SEI layer, wherein the inner SEI layer has a higher ionic conductivity than the outer SEI layer, and wherein the inner SEI layer is at least about twice as thick as the outer SEI layer.

2. The electrode of claim 1, wherein the inner SEI layer has a thickness of between about 5 nanometers and 50 nanometers.

3. An electrochemical cell comprising:
   a negative electrode comprising an electrochemically active structure comprising a high capacity active material and a multilayered SEI structure formed on a surface of the electrochemically active structure during formation of the electrochemical cell, the multilayered SEI structure comprising:
   an inner SEI layer formed over the electrochemically active structure; and
   an outer SEI layer formed over the inner SEI layer,
   wherein the inner SEI layer has a different composition and/or morphology than the outer SEI layer, wherein the inner SEI layer has a higher ionic conductivity than the outer SEI layer, and wherein the inner SEI layer is at least about twice as thick as the outer SEI layer.

4. The electrode of claim 3, wherein the outer SEI layer comprises one or more boron-based salts.

5. The electrode of claim 3, wherein the one or more boron-based salts comprise lithium bis(oxalato)borate (Li-BOB).

6. The electrode of claim 1, wherein the outer SEI layer comprises one or more ethylene carbonate reduction products.

7. The electrode of claim 1, wherein the inner SEI layer comprises one or more poly-vinylene carbonates.

8. The electrode of claim 1, wherein the porosity of the inner SEI layer is greater than a porosity of the outer SEI layer.

9. The electrode of claim 1, wherein the inner SEI layer has a porosity of between about 30% and 60%.

10. The electrode of claim 1, wherein the high capacity active material is selected from the group consisting of silicon, tin, and germanium.

11. The electrode of claim 1, wherein the electrochemically active structure is a nanostructure.

12. The electrode of claim 1, further comprising an intermediate SEI layer positioned in between the inner SEI layer and the outer SEI, wherein the intermediate SEI layer has a different composition or morphology than the outer SEI layer and a different composition or morphology than the inner SEI layer.

13. An electrochemical cell comprising:
   a negative electrode comprising an electrochemically active structure comprising a high capacity active material and a multilayered SEI structure formed on a surface of the electrochemically active structure during formation of the electrochemical cell, the multilayered SEI structure comprising:
   an inner SEI layer formed over the electrochemically active structure; and
   an outer SEI layer formed over the inner SEI layer,
   wherein the inner SEI layer has a different composition and/or morphology than the outer SEI layer.

* * * * *